United States Patent Office 3,385,904
Patented May 28, 1968

3,385,904
DECYCLIZATION OF FLUORINATED CYCLIC ETHERS TO PERFLUORINATED TERTIARY ALCOHOLS
Frank J. Pavlik, St. Paul, Minn., assignor to Minnesota Mining and Manufacturing Company, St. Paul, Minn., a corporation of Delaware
No Drawing. Filed Oct. 30, 1962, Ser. No. 234,222
2 Claims. (Cl. 260—633)

This invention relates to a process for the treatment of fluorinated cyclic ethers having at least 4 carbon atoms. In one aspect this invention relates to the production of oxygenated derivatives from such fluorinated cyclic ethers.

Perfluorinated cyclic monoethers are known in the art. The perfluorinated cyclic monoethers are prepared as products and by-products from the electrochemical cell as disclosed in U.S. Patent No. 2,519,983—Simons—issued Aug. 22, 1950. Specific perfluorinated cyclic monoethers and the method of preparation thereof by the electrochemical cell are disclosed in U.S. Patent No. 2,594,272—Kauck et al.—issued Apr. 29, 1952, and in U.S. Patent No. 2,644,823—Kauck et al.—issued July 7, 1953.

The perfluorinated cyclic monoethers having at least 4 carbon atoms are useful as refrigerants, solvents, dielectric or insulating fluids, etc. They are noted for their chemical and physical stability and for their solvent action. These compounds are difficult to use as reactants or to convert to other chemical compounds, and few, if any, reactions with these compounds are known in the art. Since the perfluorocyclic monoethers having at least 4 carbon atoms are available in the art as a direct product and as a by-product, it is much to be desired to provide a method for the conversion of these cyclic monoethers to other chemical compounds which are useful.

It is an object of this invention to provide new and useful compounds.

It is an object of this invention to provide a process for the conversion of perfluorocyclic monoethers to other compounds.

It is another object of this invention to provide a new method for making perfluorinated tertiary alcohols.

Various other objects and advantages of the present invention will become apparent to those skilled in the art from the accompanying description and disclosure.

According to this invention, a perfluorocyclic monoether in which one of the vicinal carbon atoms is completely substituted with perfluoroalkyl radicals is decyclized in contact with hydrogen fluoride with or without the presence of a decyclization catalyst under conditions such that the cyclic ether chain is opened to produce the corresponding tertiary alcohol. The perfluorocyclic monoethers can be decyclized in the presence of catalysts, such as antimony pentafluoride, cesium fluoride, activated carbon and pyridine. The temperature conditions utilized are from about 20° C. to about 350° C. and pressures utilized are atmospheric or substantially elevated.

The perfluorocyclic monoethers as the starting compounds of this invention are designated perfluoroisoalkylene oxides - 1,2 and the preferred ethers are represented by the following typical formula:

(1) 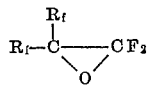

in which $R_f$ is defined as a perfluoroalkyl radical of less than 10 carbon atoms and preferably at least one $R_f$ is a perfluoromethyl radical.

Examples of perfluorocyclic monoethers falling within the scope of the starting compounds of this invention include perfluoroisobutene oxide - 1,2; perfluoro - 2 - methylbutene oxide - 1,2; and perfluoro - 2 - methylpentene oxide - 1,2.

The amount of hydrogen fluoride is not critical except insofar as at least stoichiometric amounts in relation to the cyclic ether are required, but large excesses may be used without departing from the scope of this invention. The quantity of decyclization catalyst, if used, may vary over a considerable range. Usually the weight ratio of perfluorocyclic monoether to decyclization catalyst is between about 1:5 and 10:1.

The typical equation for the reaction involved for the perfluorocyclic monoethers is shown below:

(2) 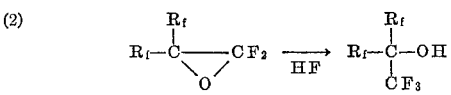

As previously mentioned, the perfluorocyclic monoether starting compounds can be prepared from the electro-chemical cell. These ethers can also be prepared by oxidation of perfluoroolefins with hydrogen peroxide in an aqueous alkaline solution, such as in the presence of an aqueous alkali carbonate solution, e.g. sodium carbonate, at a temperature between about 0° C. and about 50° C.

The following examples are offered as a better understanding of the present invention and relate to the conversion of the perfluorocyclic monoethers and their useful derivatives, and the examples are not to be construed as unnecessarily limiting the invention.

Example I

To 10 ml. of acetone and 31 g. of 30% hydrogen peroxide at 0°–5° C., in a two-neck, one-liter glass flask with a magnetic stirrer and Dry Ice condenser was added 27 g. (0.135 m.) of perfluoroisobutene. Water, 75 ml., containing 15 g. $Na_2CO_3$ and 16 g. $Na_2HPO_4$ was added dropwise during two hours. Stirring was continued for an additional twenty minutes. The product was distilled out through the dry ice condenser into a vacuum system. There was obtained 13.3 g. of product, a 46% yield. Infrared spectroscopy indicated about 95% perfluoroisobutene oxide and no olefin.

Example II

To 5 g. of perfluoroisobutene oxide - 1,2, in an Aminco 200-ml. bomb was charged 10 ml. of anhydrous liquid hydrogen fluoride. The bomb was placed in the Aminco rocker and heated and rocked at 250° C. for 64 hours. It was then cooled and the contents distilled through a tube containing sodium fluoride pellets to take up the unreacted hydrogen fluoride. The recovered fluorocarbon was condensed out in two fractions. The first fraction contained no unreacted perfluoroisobutene oxide and only a small amount of perfluoro - tert - butyl alcohol. The second or residue fraction contained a larger amount of perfluoro - tert - butyl alcohol as indicated by a definite infrared absorption at 2.7 microns.

Example III

To 20 g. of anhydrous hydrogen fluoride and 5 g. of antimony pentafluoride in 300-ml. stainless steel autoclave was charged 35 g. of perfluoroisobutene oxide from Example I. The mixture was agitated in an Aminco rocking mechanism at 100° C. for sixteen hours. The product was then distilled out in vacuo through a steel tube containing sodium fluoride pellets to react with the excess hydrogen fluoride. There was obtained 21 g. of perfluoro-tert-butyl alcohol by distillation of the condensed fluorocarbon. It boiled at 48° C. and showed a hydroxy absorption in the infrared region at 2.7μ. Nuclear magnetic resonance indicates the alcohol structure. The pKa of this material was determined to be about 5.5.

Example IV

Sodium perfluoro-tert-butylate, 4.76 g., was prepared from sodium metal and perfluoro-tert-butyl alcohol of Example III in anhydrous ethyl ether at 5° C. initially, then gradually warming to 25° C. The ether, after filtration of the solution from insoluble salts, was removed in vacuo at 1 mm. and 40° C. To this salt was added 50 ml. petroleum ether (dried over $P_2O_5$), a trace of pyrolgallic acid and 1.7 g. acrylyl chloride. The reaction was stirred at room temperature for 64 hours. The mixture was filtered, washed with aqueous sodium bicarbonate and water and finally dried over Drierite and sodium sulfate. Distillation through a 10-plate column gave 2.3 g. of product boiling at 99°–101° C. A yield of 43% was obtained. Gas liquid chromatography indicated a purity of 98%. Infrared spectroscopy indicated perfluoro-tert-butyl acrylate by absorptions at $5.5\mu$, $6.1\mu$ and $7.8\mu$. This material when polymerized and applied on textiles gave oil and water repellency to the textile.

Example V

Perfluoro-tert-butoxy methacrylate was prepared from perfluoro-tert-butyl alcohol with 2-methyl pyridine as the acid acceptor without added solvent. The yield was 78%; the boiling point was 30° C./0.5 mm. This material is useful as a monomer for making plastics and resins.

Example VI

Sodium perfluoro-tert-butyl, 15.3 g. (0.059 m.) prepared in a manner similar to Example IV and 0.08 m. ethylene bromohydrin was heated at reflux in methylethyl ketone for 88 hours. An 85% yield of 2-(perfluoro-tert-butoxy) ethanol $(CF_3)_3COCH_2CH_2OH$ boiling at 125° C./740 mm. was obtained by distillation. Ethylene oxide and the perfluoro-tert-butyl alcohol or the sodium salt thereof gave the same product as above, but also higher boiling liquids. This material is useful for conversion to acids and esters and directly as a solvent and a plasticizer.

Preparation of the methacrylate of the above 2-(perfluoro-tert-butoxy) ethanol was accomplished as follows: To 9 g. (0.032 m) tert-$C_4F_9OCH_2CH_2OH$ (0.048 m.) of $CH_2=C(CH_3)COCl$ 20 ml. of ethyl ether and 0.05 m. of pyridine was added and the mixture was stirred overnight at room temperature. Distillation gave 7.2 g. of the methacrylate boiling at 35° C./1 mm. Analysis by infrared spectroscopy indicated an unsaturated ester. Polymerization of this monomer afforded a polymer which showed water and oil repellency for application to textiles and leather as a protective coating.

The following derivatives are also made by reaction of the above 2-(perfluoro-tert-butoxy) ethanol with diisocyanites, diacids, silanes and the like:

(3)

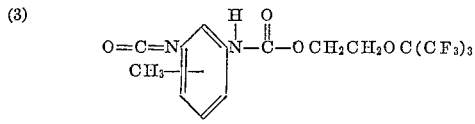

(4)

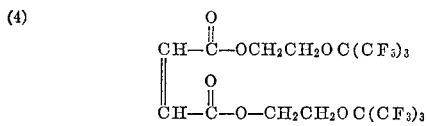

(5)

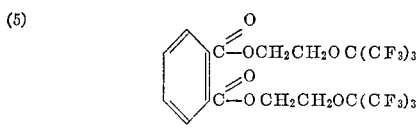

(6)     $[(CF_3)_3COCH_2CH_2O]_2SiCl_2$

Example VII

In a sealed ampoule 1.5 g. of p-bromobenzenesulfonyl chloride and 1.5 g. of sodium perfluoro-tert-butylate as made in Example III were heated at 155° C. for sixteen hours. The ampoule was cooled and opened into a vacuum manifold system. Extraction of the solid with petroleum ether left 0.5 g. of insoluble solid. The petroleum ether-soluble material yielded an oil which slowly crystallized and melted at 32°–35° C. Infrared spectroscopic analysis indicated this oil to be perfluoro-tert-butyl p-bromobenzene sulfonate. Elemental analysis was as follows:

Calculated: C, 25.7; S, 6.8; F, 36.4. Found: C, 27.0; S, 7.3; F, 34.2.

Perfluoroalkyl arylsulfonates are useful for making many organic chemicals containing the perfluoroalkyl group, such as ethers, halides, alkylbenzenes, etc.

Perfluoro-tert-butyl chlorosulfonate has also been synthesized in the above manner using sulfuryl dichloride and has similar utility.

Example VIII

From 12.45 g. (0.075 m.) of ethyl bromoacetate and 19.35 g. (0.075 m.) of $NaOC(CF_3)_3$ in 15 ml. of methylethyl ketone stirred and heated at reflux 73 hours there was obtained 13 g. (50%) of ethyl (perfluoro-tert-butoxy) acetate boiling at 140°–145° C./750 mm. Hydrolysis of this ester in 12% aqueous sodium hydroxide overnight at room temperature gave after acidification and extraction (perfluoro-tert-butoxy) acetic acid which crystallized from ether-hexane and melted at 85°–87° C.

A chrome complex was made from this acid, and paper and leather were treated with its solution in isopropyl alcohol. The results indicated good water and oil repelling properties to the paper and leather. Other derivatives of this acid can be made which are useful in paints, plastics, elastomers, i.e. vinyl esters as monomers and diol esters as plasticizers.

Example IX

To 10 ml. of methylethyl ketone was added 5.16 g. (0.02 m.) $NaOC(CF_3)_3$ and 4.66 g. (0.02 m.) 11-bromoundecene. To promote the reaction, 0.35 g. NaI was added and the reaction heated for 192 hours at reflux. Filtration yielded a total of 1.15 g. of a mixture of NaBr and NaI or 56% conversion based on NaBr content. Distillation of the filtrate through a 3-plate column gave 3.18 g. of 11-(perfluoro-tert-butoxy) undecene boiling at 56° C./0.5 mm., d. 1.22, $n_D^{79°\,F.}$ 1.3678. Infrared spectroscopy indicated the character absorptions for unsaturation and fluorocarbon.

Derivtives of this material can be made as follows:

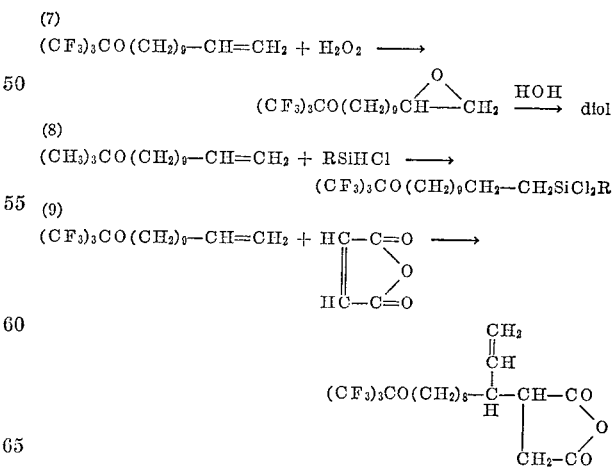

Other similar ω-bromoundecyl derivatives can be made, such as alcohols and acids. These derivatives are useful as plasticizers and monomers for making polymers.

Example X

To 0.87 g. (0.05 m.) of 2,4-toluene-diisocyanate in 5.2 g. of ethyl acetate was added a trace of phenyl mercuric acetate and 2.36 g. (0.01 m.) perfluoro-tert-butyl alcohol. The ampoule was sealed and heated at 100° C.

and agitated for seventeen hours. An infrared spectrum of the recovered solution showed urethane was present in the product and useful for making urethane type resins.

Example XI

To 13.0 g. (0.05 m.) $NaOC(CF_3)_3$ was added 25 ml. dry petroleum ether (boiling at 30° to 60° C.). This was cooled to −80° C., and 16.4 g. of $C_2H_5SiCl_3$ (0.1 m.) was added and stirred overnight at −80° C. The reaction mixture was warmed to 50° C. and stirred twenty hours. After cooling, the mixture was filtered and the filtrate distilled through a 3-plate column. There was obtained 6.0 g. of a fraction boiling at 97°–99° C. containing some $EtSiCl_3$ and 3.5 g. of chlorodiethyl-perfluoro-tert-butoxy silane which boiled at >99° C. Infrared analysis of the latter indicates the above material. This product can be hydrolyzed with water to produce a silicone useful for coating textile fabrics.

Example XII $NaOC(CF_3)_3$ (6.45 g.), 0.025 m. in acetone, was added to 5 g. (0.055 m.) cyanuric chloride in acetone at 0° C. during 105 minutes. Overnight stirring, 22 hours, was conducted at room temperature. The reaction mixture was then filtered and the acetone removed from the filtrate in vacuum. There was recovered 2.5 g. of light yellow liquid and unreacted cyanuric chloride. Infrared indicated desired perfluoro-tert-butoxy dichlorotriazine. This is useful for reaction with amines and subsequently with formaldehyde to produce textile treating resins.

Example XIII

From 3.87 g. (0.03 m.) $(CH_3)_2SiCl_2$ and 15.4 g. (0.06 m.) $NaOC(CF_3)_3$ in 35 ml. petroleum ether 30°–60° C. there was obtained after 68 hours at reflux 6.0 g. of distilled (10-plate column) product, boiling at 146° C. Infrared analysis indicated no OH or carbonyl absorptions. Thus the product was $(CH_3)_2Si(OC_4F_9)_2$ useful as a solvent.

Example XIV

To 2.2 g. triethyl amine and 4.72 g. perfluoro-tert-butyl alcohol in 10 ml. dichloromethane at 0°–5° C. was added drop-wise and with stirring 5.64 g. perfluoromethane sulfonic anhydride. Stirring at room temperature was continued 88 hours. The volatile material was then distilled from the non-volatile in vacuum, then redistilled. There was obtained 3.6 g. at a boiling point of 91° C. Analysis by infrared and NMR spectroscopy indicated the desired material, perfluoro-tert-butyl perfluoromethanesulfonate which is useful as a plasticizer for fluorocarbon resins.

Example XV 8.6 g. (0.033 m.) $NaOC(CF_3)_3$, 4.0 g.

$ClCH_2CHOHCH_2OH$ and 4.0 g. ethylene glycol and 9 ml. methylethyl ketone were heated at reflux 67 hours. 1.64 g. of salts were filtered off; theory 1.93 g. The product was phased out by adding water and washed three times with water. There was recovered 9.0 g. of product which was dried over Drierite. Distillation through a 4-plate column at 1 mm. gave 4.06 g. of a fraction boiling at 60°–65° C., $n_D^{73°\ F.}$ 1.3492. Infrared indicated $C_4F_9OCH_2CHOHCH_2OH$, useful for preparation of polyurethanes and polyesters.

Various alterations and modifications of reaction conditions may become apparent to those skilled in the art without departing from the scope of this invention.

Having described my invention, I claim:

1. A process which comprises reacting a perfluoroisoalkylene oxide-1,2 having at least 4 and not more than 20 carbon atoms per molecule with anhydrous hydrogen fluoride at a temperature between about 20 and about 350° C. to produce the corresponding tertiary-alkyl alcohol.

2. The process of claim 1 in which said perfluoroisoalkylene oxide-1,2 is perfluoroisobutene oxide-1,2 and the product is perfluoro-tert-butyl alcohol.

References Cited

UNITED STATES PATENTS 3,213,134  12/1965  Morin _____ 260—633
3,227,674  1/1966   Middleton _____ 260—633

OTHER REFERENCES

Simmons et al., Jr. Am. Chem. Soc., vol. 82 (1960), pp. 2288–96.

I. L. Knunyants et al., Chem. Abstract, vol. 54 (1960), page 22484.

Lovelace et al., Aliphatic Fluorine Compounds, 1958, pp. 138 to 143.

Haszeldine, J. Chem. Soc., (1952), pp. 3423 to 3428.

Haszeldine, "Nature," vol. 168 (1951), pp. 1028 to 1031.

Henne et al., J. Am. Chem. Soc., vol. 75 (1953), pp. 991 and 992.

Henne et al., J Am. Chem. Soc., vol. 75 (1953), pp. 992 to 994.

Haszeldine, Abstracts of Papers 122nd Meeting American Chemical Society (1952) p. 13K.

Haszeldine, J. Chem. Soc., 1953, pp. 1748 to 1757.

Haszeldine, J. Chem. Soc., 1953, pp. 1757 to 1763.

Pierce et al., J. Am. Chem. Soc., vol. 76 (1954), pp 474 to 478.

McBee et al., J. Am. Chem. Soc., vol. 77 (1955), pp. 6387 to 6389.

Haszeldine, J. Chem. Soc., 1954, pp. 1273 to 1279.

Dyatkin, Tetrahedron, vol. 21 (1965), pp. 2991 to 2995.

BERNARD HELFIN, *Acting Primary Examiner.*

LEON ZITVER, *Examiner.*

M. B. ROBERTO, J. E. EVANS, *Assistant Examiners.*

UNITED STATES PATENT OFFICE
CERTIFICATE OF CORRECTION

Patent No. 3,385,904                        May 28, 1968

Frank J. Pavlik

It is certified that error appears in the above identified patent and that said Letters Patent are hereby corrected as shown below:

Column 3, line 29, "butyl" should read -- butylate --. Column 4, line 44, "character" should read -- characteristic --; same column 4, formula (8), the left-hand portion of the formula reading "$(CH_3)_3$" should read -- $(CF_3)_3$ --.

Signed and sealed this 16th day of December 1969.

(SEAL)
Attest:

Edward M. Fletcher, Jr.                      WILLIAM E. SCHUYLER, JR.
Attesting Officer                              Commissioner of Patents